(12) United States Patent
Schmidt

(10) Patent No.: US 6,367,243 B1
(45) Date of Patent: Apr. 9, 2002

(54) ATOMIC-BASED COMBINED CYCLE PROPULSION SYSTEM AND METHOD

(75) Inventor: George R. Schmidt, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/546,030

(22) Filed: Apr. 10, 2000

(51) Int. Cl.[7] .............................. G21D 1/00; H05B 1/00; F02K 3/00; G21C 23/00
(52) U.S. Cl. .................... 60/203.1; 60/240; 376/318
(58) Field of Search ................. 60/203.1, 204, 60/240, 262; 376/318, 324

(56) References Cited

U.S. PATENT DOCUMENTS

| | | | | |
|---|---|---|---|---|
| 3,383,858 A | * | 5/1968 | Willinski et al. | ............ 376/318 |
| 3,955,784 A | * | 5/1976 | Salkeld | ...................... 60/245 X |
| 4,327,886 A | * | 5/1982 | Bell et al. | .................. 60/245 X |
| 4,441,312 A | * | 4/1984 | Smith | ............................ 60/245 |
| 5,052,176 A | * | 10/1991 | Labatut et al. | ................. 60/225 |
| 5,159,809 A | * | 11/1992 | Ciais et al. | .................... 60/225 |
| 5,410,578 A | * | 4/1995 | Walton | ......................... 376/318 |

OTHER PUBLICATIONS

Academic Press Dictionary of Science and Technology, Harcourt, Entry: thermonuclear rocket, Mar. 1999.*

* cited by examiner

Primary Examiner—Charles G. Freay
Assistant Examiner—Michael K. Gray
(74) Attorney, Agent, or Firm—James J. McGroary

(57) ABSTRACT

A method and system are provided for propelling an aerodynamic vehicle into space. The aerodynamic vehicle uses a nuclear-based thermal rocket (NTR) propulsion system capable of producing a hydrogen exhaust. A flow of air is introduced into the hydrogen exhaust to augment the thrust force at speeds of the vehicle up to approximately Mach 6. When the speed of the vehicle is approximately Mach 6 and the altitude of the vehicle is approximately 40 kilometers, the flow of air is stopped and the vehicle is propelled into space using only the NTR.

6 Claims, 2 Drawing Sheets

ATOMIC-BASED COMBINED CYCLE PROPULSION SYSTEM AND METHOD

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to propulsion systems. More specifically, the invention is an atomic-based propulsion system and method for operating same.

2. Description of the Related Art

Establishing routine, low-cost access to Earth's orbit is critical to mankind's future in space. The excessive costs of launching even small payloads has severely limited activities in Earth's orbit and restricted the ambitiousness of interplanetary missions. Truly low-cost access to space will require launch systems having low propellant fractions (i.e., the propellant fraction $\lambda$=propellant mass/gross vehicle mass) and the operational flexibility of modern passenger aircraft.

For years, it was believed that progress made in materials technology since the early space program (e.g., composites, etc.) would enable very lightweight vehicle structures and use of chemical propulsion for single-stage-to-orbit (SSTO) operation. Other enhancements, such as aerospike nozzles and tri-propellant engines, improved chemical rocket performance over the flight envelope. However, even with the improvements in material and chemical-rocket technologies, the propellant fractions of today's space vehicles are simply too high ($\lambda$=0.9) and result in vehicles with a ratio of payload mass to gross vehicle mass of less than 0.1.

More recently, chemically-powered rocket based combined cycle (RBCC) propulsion systems have been considered. These systems integrate several rocket and air breathing propulsion modes into one engine. Because the specific impulse (or $I_{SP}$ as it is known) of the air breathing modes is much higher than a basic rocket, the effective mission specific impulse (i.e., average performance) is greater than other SSTO concepts. One of the simplest RBCC concepts is illustrated schematically in FIG. 1. A chemically-powered rocket 10 is typically one that burns a mixture of liquid hydrogen (H) and liquid oxygen (O). Rocket exhaust 12 is predominantly a hot water vapor and is expelled into a nozzle 14. Air 16 is inducted into nozzle 14 where it mixes with exhaust 12 as indicated at 18. In order to gain additional thrust, mixture 18 must combust. Such combustion can be achieved in one or a combination of two ways. If rocket 10 is operated efficiently so that exhaust 12 is mostly hot water vapor, additional hydrogen can be added to mixture 18 as supplied from a hydrogen fuel tank 20. Alternatively, or additionally, rocket 10 can be run in a fuel-rich mode so that exhaust 12 has excess hydrogen contained therein. However, since this condition also lowers the temperature of exhaust 12, one or more ignition devices 22 (or flame stabilizers as they are also known) are used to raise the temperature of mixture 18 to the point of combustion. Obviously, both of these options require apparatus and/or fuel which adds to the propulsion system's weight, cost and complexity.

While systems such as that illustrated in FIG. 1 have improved thrust efficiency (i.e., increased $I_{SP}$ specifications), propellant mass in chemically-powered rockets makes their propellant fractions exceed that which would be desirable for an airliner-type of vehicle. Further, to take advantage of the increased specific impulse, chemically-powered rockets must operate in the air-breathing mode well up into supersonic speeds of Mach 8 or greater. However, by requiring the vehicle to operate at higher speeds within the atmosphere to support the air-breathing mode of the vehicle, aerodynamic heating of the vehicle's surface becomes a major concern. For example, vehicle drag increases due to friction between the external air flow and the vehicle's surface. This not only detracts from thrust performance, but also greatly increases the amount of heat deposited on the vehicle's surface. In addition, aerodynamic heating can cause vehicle surface temperatures to exceed the surface material's temperature limits thereby requiring the use of a heavy active cooling system to dispose of the heat.

SUMMARY OF THE INVENTION

Accordingly, it is an object of the present invention to provide a propulsion system and method that offers both improved thrust efficiency and low propellant fractions.

Another object of the present invention is to provide a propulsion system and method that can make use of lightweight fuel.

Still another object of the present invention is to provide a propulsion system and method that uses a single rocket stage.

Yet another object of the present invention is to provide a propulsion system and method that changes modes at increasing speeds and altitudes to maximize efficiency.

A still further object of the present invention is to provide a propulsion system and method that reduces aerodynamic heating concerns by lowering the velocity at which the system operates in an air-breathing mode.

Other objects and advantages of the present invention will become more obvious hereinafter in the specification and drawings.

In accordance with the present invention, a method and system are provided for propelling an aerodynamic vehicle into space. An aerodynamic vehicle has a nuclear-based thermal rocket (NTR) propulsion system capable of producing a hydrogen exhaust. When the NTR propulsion system is operated, a thrust force is applied to the vehicle so that the vehicle is launched from a static condition and is propelled through the air. A flow of air is introduced into the hydrogen exhaust to augment the thrust force at speeds of the vehicle up to approximately Mach 6. At slower speeds, thrust augmentation is primarily the result of air/exhaust mixing, although some chemical combustion may also be taking place. At higher speeds, thrust augmentation is primarily the result of combustion of the air/exhaust mixture. The flow of air introduced into the hydrogen exhaust is adjusted based on the speed and altitude of the vehicle. When the speed of the vehicle is approximately Mach 6 and the altitude of the vehicle is approximately 40 kilometers, the flow of air is stopped.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
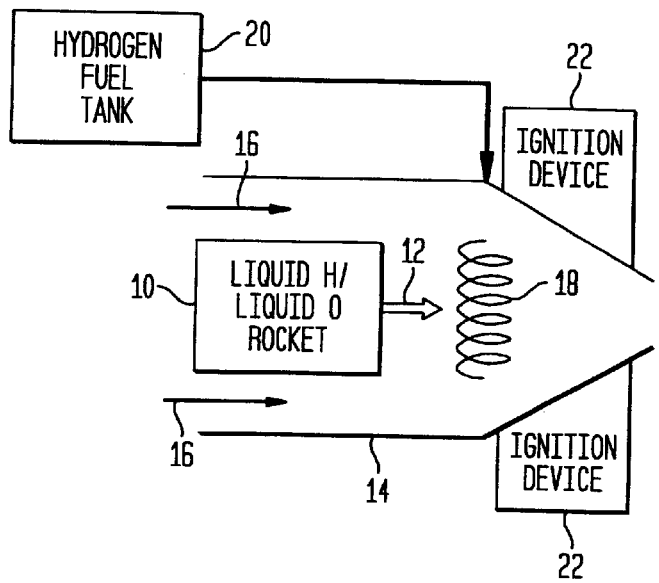
FIG. 1 is a schematic view of a prior art chemically powered rocket-based combined cycle propulsion system.
Figure 2:
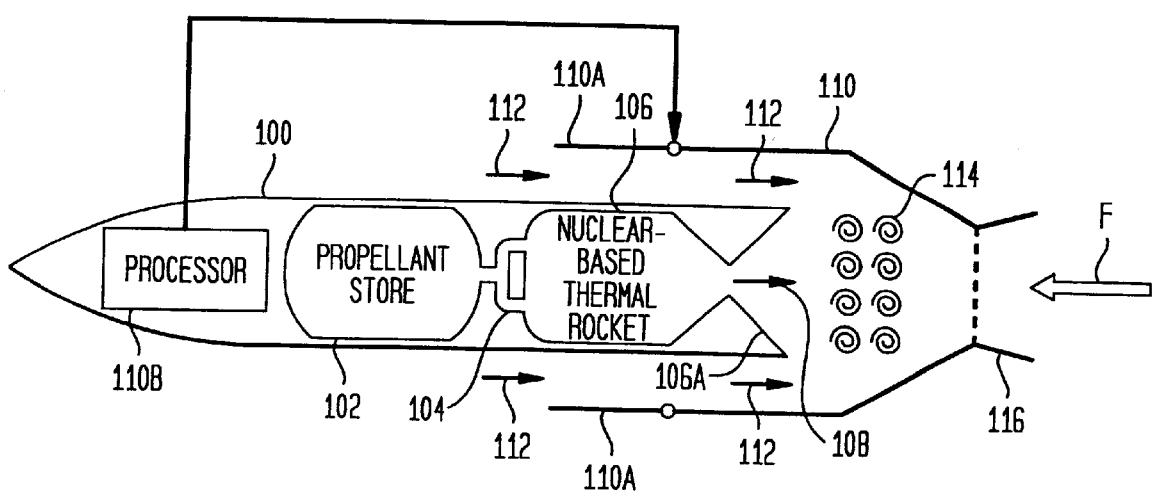
FIG. 2 is a schematic view of an atomic-based combined cycle propulsion system according to the present invention during its ejector mode.
Figure 3:
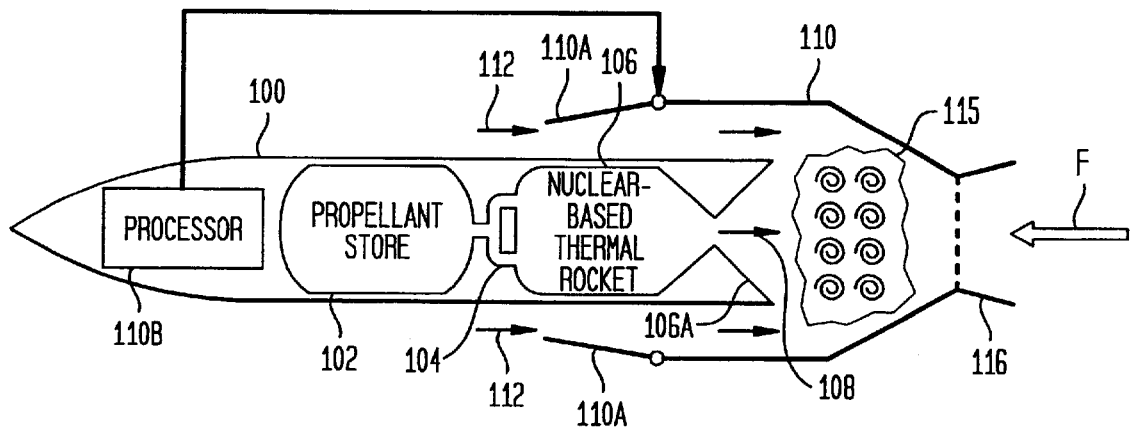
FIG. 3 is a schematic view of the atomic-based combined cycle propulsion system during its ramjet mode.
Figure 4:
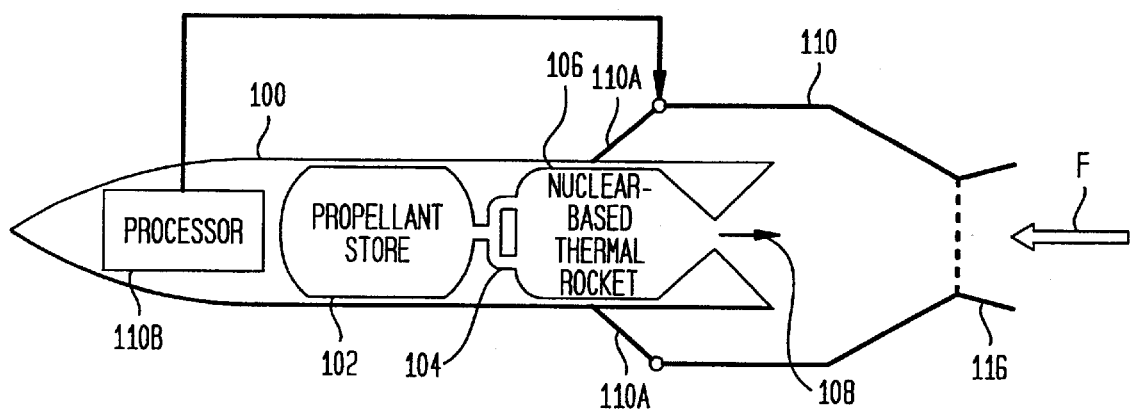
FIG. 4 is a schematic view of the atomic-based combined cycle propulsion system during its rocket mode.

Referring now to the drawings, and more particularly to FIGS. 2–4, an atomic-based combined cycle propulsion system is illustrated schematically in each of its ejector (FIG. 2), ramjet (FIG. 3) and rocket modes (FIG. 4) in accordance with the present invention. Each of the views will use the same reference numerals for the elements that are common therebetween.

The system of the present invention is incorporated into an aerodynamic vehicle body 100 suitable for earth-to-space travel. The particular design of vehicle body 100 is not a limitation of the present invention. Housed within vehicle body 100 is a propellant tank or store 102 containing a fuel of choice. In most instances, the fuel will be liquid hydrogen owing to its low molecular weight, cost, availability, etc. However, methane and other hydrocarbon fuels are possible candidates due to their even lower cost, broad availability and ease with which they can be handled.

Coupled to propellant store 102 via fuel lines 104 is a nuclear-based thermal rocket 106, the particular design of which can vary without departing from the scope of the present invention. A variety of nuclear-based thermal rockets are disclosed in the prior art. For example, see R. W. Bussard et al., "Fundamentals of Nuclear Flight," McGraw Hill, 1965; S. K. Borowski et al., "Nuclear Thermal Rockets: Key to Moon-Mars Exploration," Aerospace America, Vol. 30, No. 7, July 1992; and C. W. Watson, "Nuclear Rockets: High-Performance Propulsion for Mars," Los Alamos National Laboratory, Publication LA-12784-MS, May 1994.

Regardless of the design of rocket 106, exhaust gases 108 are expelled through an exhaust nozzle 106A. An air induction system 110 is provided to selectively introduce surrounding ambient air 112 into exhaust gases 108. Such selective introduction would be controlled by adjusting, for example, a plurality of intakes 110A distributed about vehicle body 100. Operation of intakes 110A would typically be controlled in a pre-programmed fashion by an on-board processor 110B. Control of intakes 110A could also come from a remotely-located, pre-programmed processor, or by an on-board (or remotely-located) adaptive control system. The choice of control for intakes 110A can be tailored to meet specific mission requirements.

In general, at vehicle speeds of less than approximately Mach 6 and vehicle altitudes less than approximately 40 kilometers, air 112 is introduced into exhaust gases 108 via intakes 110A where exhaust gases 108 and air 112 mix together to form mixture 114. The mixing action transfers energy to air 112 and increases momentum flux exiting nozzle 116. In other words, the introduction of air 112 augments the thrust force F applied to vehicle body 100.

More specifically, from the static at-launch condition of zero velcity up to a vehicle speed of approximately Mach 2.5, the system of the present invention will typically operate as an ejector as shown in FIG. 2. That is, thrust augmentation (due to the introduction of air 112) is derived primarily from the physical mixing of exhaust gases 108 with air 112. (Note that even at these lower velocities additional energy may be obtained from some combustion of exhaust gases 108 and air 112). The term "ejector" refers to the pumping action that a low-pressure fluid stream (i.e., exhaust gases 108) exerts on a higher pressure fluid (i.e., air 112 introduced into system 110). Thus, when intakes 110A are opened, air 112 is sucked into the lower pressure exhaust gases 108 thereby causing the two to mix as indicated in FIG. 2 at reference numeral 114. This mixing process transfers momentum and energy from exhaust gases 108 to air 112 in mixture 114. Although the total energy of both exhaust gases 108 and air 112 remains constant, the total momentum increases and reaches a theoretical maximum when the exit velocity of mixture 114 exiting nozzle 116 is uniform, i.e., the velocity of exhaust gases 108 and air 112 in mixture 114 is the same.

From vehicle speeds of approximately Mach 2.5 to Mach 6, the benefits from ejector-mode pumping will diminish, and the primary source of thrust augmentation will be due to combustion. That is, most of the mixture of exhaust gases 108 and air 112 will combust as indicated by burning mixture 115 in FIG. 3. This mode is known as the ramjet mode of operation. Assuming the fuel being burned in rocket 106 is hydrogen-based, nuclear-based thermal rocket 106 produces hydrogen exhaust gases 108 having an extremely high temperature that can reach 1500° Kelvin. Since exhaust gases 108 are generated at such high temperatures, and since the pressure of air 112 increases at higher vehicle velocities, burning mixture 115 is generated without requiring any flame stabilization or auxiliary ignition devices. Note that as the speed of vehicle 100 increases, the amount (e.g., mass) of air 112 introduced into exhaust gases 108 is adjusted by controlling intakes 110A. Typically, the mass of air 112 introduced into exhaust gases 108 is reduced with increasing vehicle speed and altitude.

In the present invention, aerodynamic heating is kept under control by limiting the above-described ramjet operation to vehicle speeds of approximately Mach 6 or less. Further, at altitudes above 40 kilometers, the density of air 112 is too low to derive any benefit from its introduction into exhaust gases 108. Accordingly, at the combination of a vehicle speed of approximately Mach 6 and vehicle altitude of 40 kilometers, intakes 110A are closed as illustrated in FIG. 4. This mode is known as the rocket mode of operation. That is, no more mixing of exhaust gases 108 and air takes place and only exhaust gases 108 exit nozzle 114.

The advantages of the present invention are numerous. The higher exhaust gas temperatures generated by a nuclear-based thermal rocket are used advantageously in an air-breathing mode propulsion system. Thrust augmentation is achieved at lower speeds primarily through the mixing action of (inducted) ambient air with the exhaust gas and, secondarily, through combustion of some of the exhaust stream with oxygen in the inducted air. At medium speeds up to Mach 6, thrust augmentation is achieved primarily through combustion when inducted air mixes with the rocket's exhaust stream. Such combustion is achieved without any flame stabilization and/or auxiliary ignition devices. Further, because of the higher specific impulse produced by the nuclear-based thermal rocket, the transition from combined nuclear rocket/air-breathing mode to pure nuclear rocket mode can occur at slower vehicle speeds thereby reducing aerodynamic heating effects.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A combined cycle propulsion system for an aerodynamic vehicle, comprising:

a propellant store housed in the vehicle for storing a fuel therein;

a nuclear-based thermal rocket (NTR) coupled to said propellant store, said NTR burning said fuel and producing a hydrogen exhaust stream whereby a thrust force is applied to the vehicle so that the vehicle is propelled through the air; and means for selectively introducing an uncompressed flow of the air surrounding the vehicle into said exhaust stream at speeds of the vehicle up to approximately Mach 6, and for stopping said flow of air when a specified combination of speed of the vehicle and altitude of the vehicle is achieved, said specified combination being defined by a speed of the vehicle of approximately Mach 6 and an altitude of the vehicle of approximately 40 kilometers.

2. A system as in claim 1 wherein said fuel is a hydrogen-based fuel.

3. A method of propelling an aerodynamic vehicle into space, comprising the steps of:

providing an aerodynamic vehicle with a nuclear-based thermal rocket (NTR) propulsion system capable of producing a hydrogen exhaust, wherein a thrust force is applied to the vehicle;

operating said NTR propulsion system starting at a static at-launch condition of the vehicle and all during flight of the vehicle through the air;

introducing a flow of uncompressed air into said hydrogen exhaust to augment said thrust force at speeds of the vehicle up to approximately Mach 6;

adjusting said flow of uncompressed air into said pure hydrogen exhaust based on the speed and altitude of the vehicle; and stopping said flow of uncompressed air when a specified combination of speed of the vehicle and altitude of the vehicle is achieved, said specified combination being defined by a speed of the vehicle of approximately Mach 6 and an altitude of the vehicle of approximately 40 kilometers.

4. A method according to claim 3 wherein said step of adjusting comprises the step of reducing the mass of said flow of uncompressed air as the speed and altitude of the vehicle increase.

5. A combined cycle propulsion system for an aerodynamic vehicle, comprising:

a propellant store housed in the vehicle for storing a fuel therein;

a nuclear-based thermal rocket (NTR) coupled to said propellant store to receive said fuel therefrom at a static at-launch condition of the vehicle and throughout flight of the vehicle, said NTR burning said fuel at said static at-launch condition and continuously throughout flight of the vehicle to produce a hydrogen exhaust stream whereby a thrust force is applied to the vehicle so that the vehicle is propelled through the air; and means for selectively introducing an uncompressed flow of the air surrounding the vehicle into said exhaust stream at speeds of the vehicle up to approximately Mach 6, and for stopping said flow of air when a specified combination of speed of the vehicle and altitude of the vehicle is achieved, said specified combination being defined by a speed of the vehicle of approximately Mach 6 and an altitude of the vehicle of approximately 40 kilometers.

6. A system as in claim 5 wherein said fuel is a hydrogen-based fuel.

* * * * *